US005210918A

United States Patent [19]

Wozniak et al.

[11] Patent Number: 5,210,918

[45] Date of Patent: May 18, 1993

[54] PNEUMATIC SLIDE HAMMER

[76] Inventors: Walter E. Wozniak, 18606 Oakwood Dr.; Terry C. Ernst, 16349 Stewart Rd., both of Prairieville, La. 70769

[21] Appl. No.: 784,554

[22] Filed: Oct. 29, 1991

[51] Int. Cl.[5] .......... B23P 19/04

[52] U.S. Cl. .......... 29/254; 29/275; 173/91; 173/17; 81/3.2

[58] Field of Search .......... 29/252, 254, 275; 173/91, 17; 81/3.2, 3.42

[56] References Cited

U.S. PATENT DOCUMENTS

| | | | |
|---|---|---|---|
| 703,758 | 7/1902 | Birkenstock . | |
| 855,975 | 6/1907 | Prindle . | |
| 917,242 | 4/1909 | Boyer . | |
| 919,270 | 4/1909 | Waugh . | |
| 1,092,237 | 4/1914 | Barbre . | |
| 1,292,429 | 1/1919 | Bull | 173/91 X |
| 1,604,958 | 11/1926 | Bayles | 173/91 |
| 2,561,577 | 7/1951 | Knudsen | 29/254 X |
| 3,005,443 | 10/1961 | Paulson | 121/25 |
| 4,213,301 | 7/1980 | Maier et al. | 60/407 |
| 4,586,230 | 5/1986 | Harydzak et al. | 29/254 |
| 4,650,008 | 3/1987 | Simson | 173/91 |
| 4,651,833 | 3/1987 | Karpf | 173/136 |
| 4,662,457 | 5/1987 | Bouplon | 173/91 |
| 4,823,886 | 4/1989 | Pyatov | 173/14 |
| 5,065,823 | 11/1991 | Gien et al. | 173/91 |

*Primary Examiner*—Frank T. Yost

*Assistant Examiner*—Rinaldi Rada

*Attorney, Agent, or Firm*—David L. Ray

[57] ABSTRACT

In accordance with the present invention there is provided a pneumatic slide hammer for removing a plug from a tube or other structure including a percussive piston, a housing for containing the percussive piston and for connecting to the plug to be removed from a structure, and a slidable cylindrical valve for controlling the flow of air under superatmospheric pressure to force the percussive piston against to impact against the housing and force the plug from the housing.

6 Claims, 3 Drawing Sheets

PNEUMATIC SLIDE HAMMER

BACKGROUND OF THE INVENTION

1. Field of the Invention

The invention relates to pneumatic impact devices. In particular, the present invention relates to pneumatic percussion power tools.

2. Description of the Related Art

Pneumatic power tools are known in the art. Exemplary of the pneumatic power tools of the prior art are those disclosed in the following U.S. Patents:

U.S. Pat. No. 4,823,886 discloses a vacuum-compression type percussion power tool including a housing, a cylinder fixed in the housing, a piston reciprocating in the cylinder from a reciprocating drive mechanism such as a crank mechanism driven by an electric motor, or any other suitable drive, a working tool installed in the front part of the power tool, and a floating striker which slides inside the cylinder in a space between a tail portion of the working tool and the lower end of the piston. The power tool has a sealed auxiliary chamber which is formed by means of a hollow casing which surrounds the cylinder, and a space below the striker. The auxiliary chamber is connected to a main working chamber, which is formed between the piston and a striker, through a set of compensation holes and a set of idle-stroke holes. A check valve is installed in the wall of the auxiliary chamber. This check valve, which connects the auxiliary chamber with an atmospheric-pressure space between the housing and the cylinder, allows flow of air in a direction only from the above-mentioned atmospheric-pressure space to the auxiliary chamber. As a result, during several cycles after starting the power tool, an additional quantity of air will be sucked into the auxiliary chamber via the check valve, so that after reaching established conditions, the auxiliary chamber and the main chamber will operate with an increased pressure at the commencement of each cycle. This will increase the energy of impact.

U.S. Pat. No. 4,651,833 discloses a pneumatic impact tool wherein a two-stage piston is reciprocable in the two-stage chamber of a cylinder. The tool which is to penetrate into a bone is mounted in the front portion of the cylinder and the piston strikes against such front portion in response to admission of compressed air against its rear end face. A relatively small annular shoulder of the piston faces forwardly and is continuously acted upon by compressed air. When the piston approaches or reaches the end of its forward stroke and rebounds from the front end portion of the cylinder, it seals the source of compressed air from its rear end face so that the action of compressed air upon the shoulder suffices to propel the piston rearwardly against the rear end portion of the cylinder at which time the piston reestablishes a path for the flow of compressed air against its rear end face so that is propelled forwardly against the front end portion of the cylinder.

U.S. Pat. No. 4,213,301 discloses a compressed air apparatus for driving fastening elements, such as bolts and nails, into receiving material, including a first or driving piston mounted in a first chamber through which it is axially displaceable. A pressure converter arrangement is connected to an inlet to the first chamber for supplying the compressed air required for displacing the first piston for driving in a fastening element. The pressure converter includes a storage chamber, a second chamber in communication with the storage chamber and a third chamber. A double headed piston has one head in the second chamber and the other head in the third chamber. The third chamber has a much greater transverse cross-sectional area than the second chamber. Compressed air supplied to the third chamber compresses air in the second chamber which is directed into the storage chamber. From the storage chamber, the compressed air is charged into the first chamber for driving the first piston forwardly for inserting the fastening element.

U.S. Pat. No. 3,005,443 discloses a rock drill which is a pressure fluid actuated percussive type tool including a casing, a pressure fluid actuated piston reciprocable forwardly and rearwardly in the casing, a working implement positioned to be actuated by the piston, a fluid distributing device to distribute fluid to the interior of the piston, and a control device to control the distribution of fluid to move the piston rearwardly substantially slower than in the forward direction, and to momentarily delay the piston during its rearward stroke.

U.S. Pat. No. 1,092,237 discloses a pneumatic tool, a cylinder, a piston reciprocally mounted in the cylinder, a valve housing, a shoulder formed in the valve housing, a shoulder formed in the valve housing, a valve piece mounted in the valve housing for controlling the induction of the motive fluid, the valve piece including a hollow member having an annular flange at each extremity, one of the flanges being arranged to close off the induction of the motive fluid to the rear of the piston when the valve piece is in one position, while the other flange is arranged to establish communication of the motive fluid with the cylinder in front of the piston, the last named flange adapted to rest upon the shoulder of the valve housing while the valve piece is in position to establish communication of the motive fluid with the cylinder in front of the piston, and the last named flange having a relatively small opening therethrough adapted to permit the motive fluid to escape from the rear of the valve piece when the latter moves rearwardly.

U.S. Pat. No. 919,270 discloses a hammer drill including a cylinder member having a piston chamber, a piston operating therein, and a control device for controlling the supply of motive fluid to and its exhaust from the cylinder member, the control device including a movable valve having an exhaust passage that opens through both ends thereof and a stationary closure plug for one of the open ends, the valve being movable into and out of connection with the plug.

U.S. Pat. No. 917,242 discloses a pneumatic hammer including a throttle valve and a device for automatically opening the valve by motive fluid pressure upon pressing the tool to its work.

U.S. Pat. No. 855,975 discloses a pneumatic tool including a valve box, a chambered valve therein communicating at its ends with the interior of the valve box, an exhaust port leading from within the valve box at each end of the box, a piston containing cylinder, and an exhaust port or ports leading therefrom to the valve box, and being in communication with the interior of the valve, air from the exhaust port passing to the atmosphere, in part directly through one of the exhaust ports at the end of the valve box, and in part through the valve to the exhaust port at the other end of the valve box.

U.S. Pat. No. 703,758 discloses a pneumatic riveting tool with a casing provided with supply channels and ports, including a handle at one end of the same, a tool guided in the opposite end of the casing, a piston-valve located at the interior of the casing, the piston-valve being hollow and provided with circumferential grooves and an opening in one of the grooves, a return-channel connecting the rear end of the casing with the front end a cushioning-spring located between the piston-valve and handle, a channel connecting the interior of the casing with the space behind the valve, and shoulders at the rear end of the casing for arresting the spring and the piston-valve in their forward motion, substantially as set forth.

SUMMARY OF THE INVENTION

In accordance with the present invention there is provided a pneumatic slide hammer for removing a plug from a tube or other structure including a percussive piston, a housing for containing the percussive piston and for connecting to the plug to be removed from a structure, and a slidable cylindrical valve for controlling the flow of air under superatmospheric pressure to force the percussive piston against to impact against the housing and force the plug from the housing.

The pneumatic slide hammer of the invention quickly and easily removes plugs from tubes such as plugged heat exchanger tubes.

The pneumatic slide hammer of the invention is easy to operate.

The pneumatic slide hammer of the invention is portable and can be held and operated by a single workman.

BRIEF DESCRIPTION OF THE PREFERRED EMBODIMENTS

Figure 1:
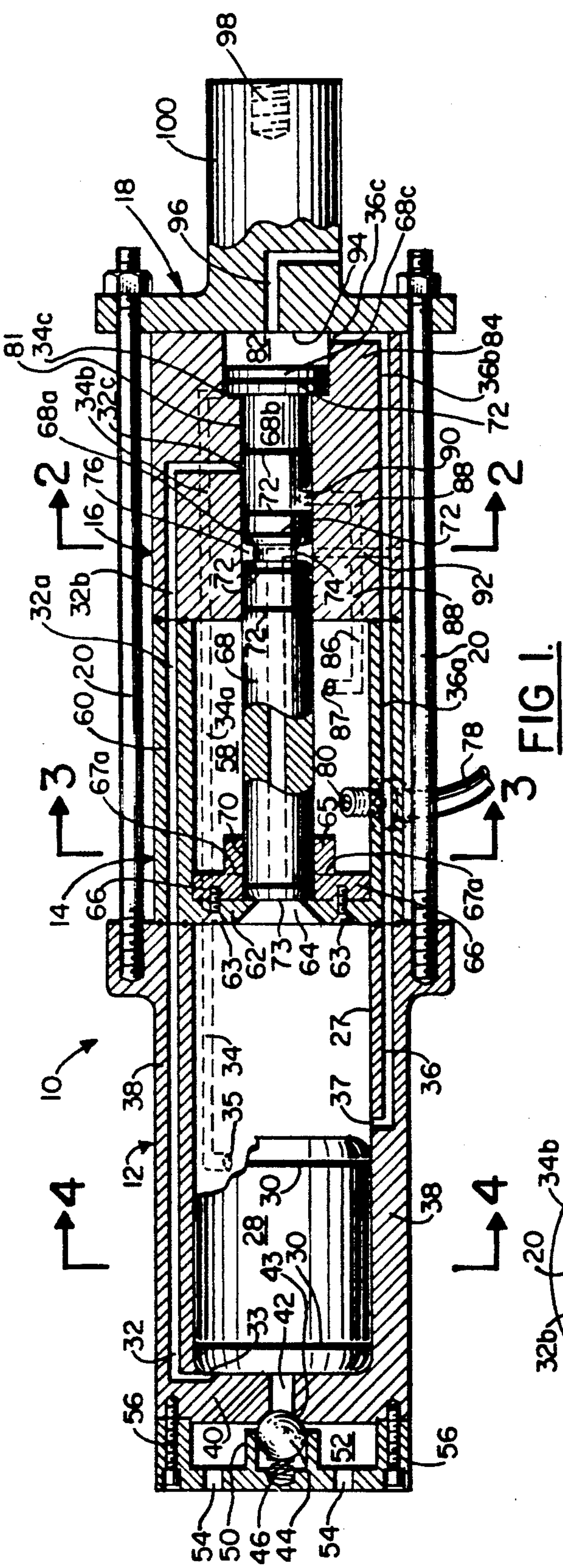
FIG. 1 is a partly cut-away, partly cross-sectional view of the pneumatic slide hammer of present invention with the air channels shown oriented slightly out of correct orientation for ease of illustration.
Figure 4:
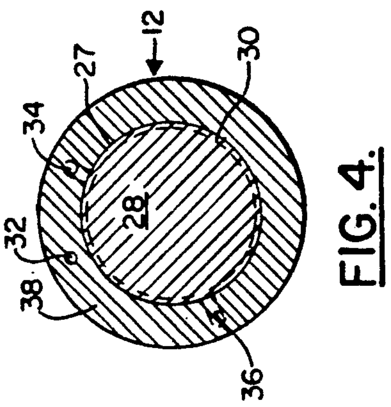
FIG. 4 is a cross sectional view taken along lines 4—4 of FIG. 1 showing the second intermediate housing with the air channels in correct orientation.

Referring now to the drawings, in FIG. 1 is shown the pneumatic slide hammer of the invention generally indicated by the numeral 10. Pneumatic slide hammer 10 has a hammer housing generally indicated by the numeral 12. Connected to hammer housing 12 is the first intermediate housing generally indicated by the numeral 14. Connected to first intermediate housing 14 is the second intermediate housing generally indicated by the numeral 16. The flange generally indicated by the numeral 18 is connected to hammer housing 12 by bolts 20—20 to force second intermediate housing 16 against first intermediate housing 14, and first intermediate housing 14 against hammer housing 12. The plug removing tool generally indicated by the numeral 22 in FIG. 9 can be connected to flange 18, or the alternate plug removing tool generally indicated by the numeral 24 in FIG. 10 may be connected to flange 18.

Hammer housing 12 is generally cylindrical in shape as can be seen in FIGS. 1, 4, 5 and 7. Hammer housing 12 has a hollow cylindrical chamber 26 therein surrounded by the cylindrical wall 38 of hammer housing 12 in which a slide hammer or percussive piston 28 is slidably received. Percussive piston 28 may have a plurality of sealing rings 30—30 thereon to maintain an air tight sliding seal between percussive piston 28 and the interior wall 27 of cylindrical chamber 26.

Figure 3:
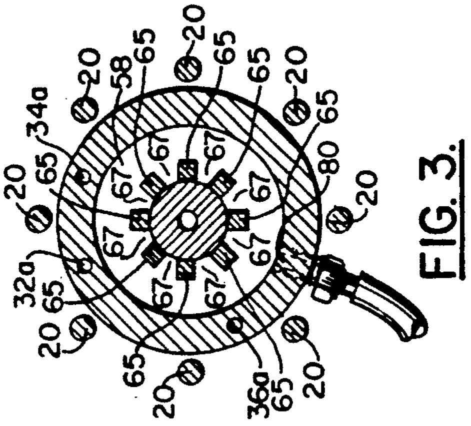
FIG. 3 is a cross sectional view taken along lines 3—3 of FIG. 1 showing the first intermediate housing with the air channels in correct orientation.
Figure 2:
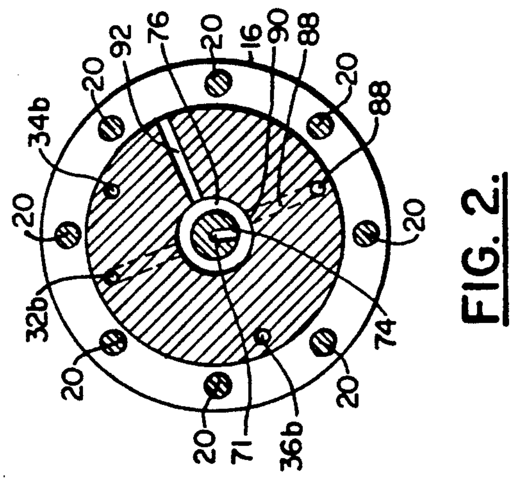
FIG. 2 is a cross-sectional view taken along lines 2—2 of FIG. 1 showing the slide hammer and slide hammer housing with the air channels in correct orientation.

Hammer housing 12 has three generally parallel air channels 32, 34, and 36 formed in cylindrical wall 38 of hammer housing 12. The air channels 32, 34, and 36 are shown out of proper orientation in FIGS. 1, 5, 6, 7, and 8 for purposes of illustration, and air channels 32, 34, and 36 are shown in proper orientation in FIGS. 2, 3, and 4. Air channels 32, 34, and 36 terminate in the wall 27 of hollow cylindrical chamber 26 at ports 33, 35, and 37, respectively.

Hammer housing 12 has a base 40 which forms the outer end of cylindrical chamber 26 and limits the movement of percussive piston 28 away from first intermediate housing 14. Base 40 has an air channel 42 therein which communicates at one end with cylindrical chamber 26 and is sealed at its only other end by ball 44 biased by spring 46. Spring 46 is connected to the outer end cap 48 of outer housing 12. A seat 43 is located in one end of channel 42 to receive ball 44.

A cup 50 extends from the outer end cap 48 to slidably hold ball 44 in alignment with seat 43 in air channel 42. Outer end cap 48 of hammer housing 12 has an air chamber 52 into which air exiting from air channel 42 around is received and an exit air channel 54 which communicates with air chamber 52 and the atmosphere surrounding hammer housing 12 to vent air from air chamber 52 to the atmosphere. Outer end cap 48 may be connected to hammer housing 12 by screws 56—56 or by any other method known in the art.

First intermediate housing 14 is shown in FIGS. 1, 3, 5, and 7. First intermediate housing 14 has a generally cylindrical air chamber 58 therein surrounded by the cylindrical wall 60 of first intermediate housing 14. Air chamber 58 terminates adjacent to cylindrical chamber 26 at wall 62 in intermediate housing 14. Wall 62 has a passage 64 which permits air to travel between air chamber 58 and cylindrical chamber 26.

Figure 7:
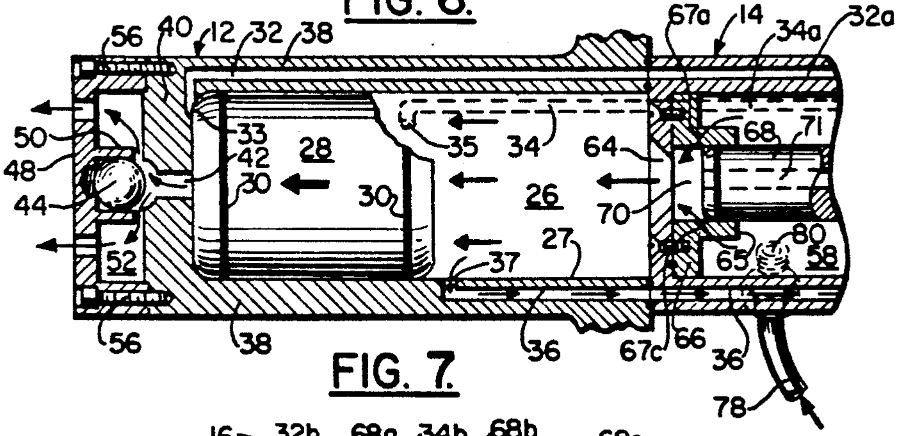
FIG. 7 is a partly cut-away, partly cross-sectional detailed view of a portion of the outer end of the pneumatic slide hammer of present invention with the percussion piston moved toward the outer end and with the air channels shown oriented slightly out of correct orientation for ease of illustration.
Figure 8:
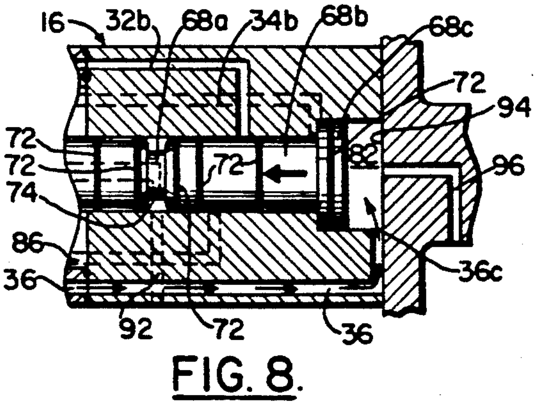
FIG. 8 is a partly cut-away, partly cross-sectional detailed view of a portion of the inner end of the pneumatic slide hammer of present invention with the air channels shown oriented slightly out of correct orientation for ease of illustration.

Rigidly connected to wall 62 by screws 63 or the like is slotted flanged cylinder 66 which slidably receives cylindrical valve 68 in cylindrical bore 70. Slotted flanged cylinder 66 has slots 67 which terminate at 67*a* therein separated by lands 65. Air travels through slots 67 as shown in FIG. 7 by the arrow when cylindrical valve 68 is forced toward flange 18.

Cylindrical valve 68 has a reduced diameter portion 68*a* axially aligned therewith and integrally formed therewith which is smaller in diameter than cylindrical valve 68 and forms movable air chamber 76 therearound. Cylindrical valve 68 also has a second portion 68*b* connected to reduced diameter portion 68*a* and axially aligned and integrally formed therewith which is of the same diameter as cylindrical valve 68. Cylindrical valve 68 also has a enlarge diameter portion 68*c* connected to second portion 68*c* and axially aligned and integrally formed therewith which is larger in diameter than cylindrical valve 68.

Cylindrical valve 68 has an air channel 71 in the center thereof which communicates with chamber 26 at port 73 through passage 64. Air channel 71 also has port 74 through which air channel 71 communicates with movable air chamber 76 formed in cylindrical valve 68. Cylindrical valve 68 and cylindrical valve portions 68*a*, 68*b* and 68*c* may have a plurality of sealing rings 72—72 thereon to maintain an air tight sliding seal between cylindrical valve 68 and the cylindrical bore 70 of slotted cylinder 66.

First intermediate housing 14 has three generally parallel air channels 32*a*, 34*a*, and 36*a* formed in cylindrical wall 60 of first intermediate housing 14 which are axially aligned with and communicate with air channels 32, 34, and 36, respectively, of hammer housing 12. An air supply line 78 having exit port 80 supplies air to air chamber 58 in intermediate housing 14.

An air channel 86 is located in first intermediate housing 14 which terminates in the wall of cylindrical chamber 58 at port 87.

Second intermediate housing 16 is shown in FIGS. 1, 2, 5, 6 and 8. Second intermediate housing 16 has a first generally cylindrical chamber 81 in which is slidably received cylindrical valve 68*b*. Axially aligned with cylindrical chamber 81 is cylindrical chamber 82 in which is slidably received cylindrical valve 68*c*. Both chambers 81 and 82 are surrounded by the cylindrical wall 84 of second intermediate housing 16. Air chamber 82 is terminated at one end by flange 18.

Second intermediate housing 16 has three generally parallel air channels 32*b*, 34*b*, and 36*b* formed in cylindrical wall 84 of second intermediate housing 16 which are axially aligned with and communicate with air channels 32*a*, 34*a*, and 36*a*, respectively, of first intermediate housing 14. Air channels 32*b*, 34*b*, and 36*b* terminate at ports 32*c*, 34*c*, and 36*c*. An air channel 88 is located in the second intermediate housing 14 which is axially aligned with the air channel 86 in first intermediate housing 14 and has port 90. An exhaust air channel 92 is located in second intermediate housing 16 to exhaust movable air chamber 76 when cylindrical valve 68 is in the proper position.

Flange 18 is shown in FIGS. 1, 6, 8, 9, and 10 to be connected adjacent to second intermediate housing 16 by bolts 20—20. Flange 18 has face 94 which forms one end of chamber 82. Air channel 96 permits air to enter and exit chamber 82.

Figure 9:
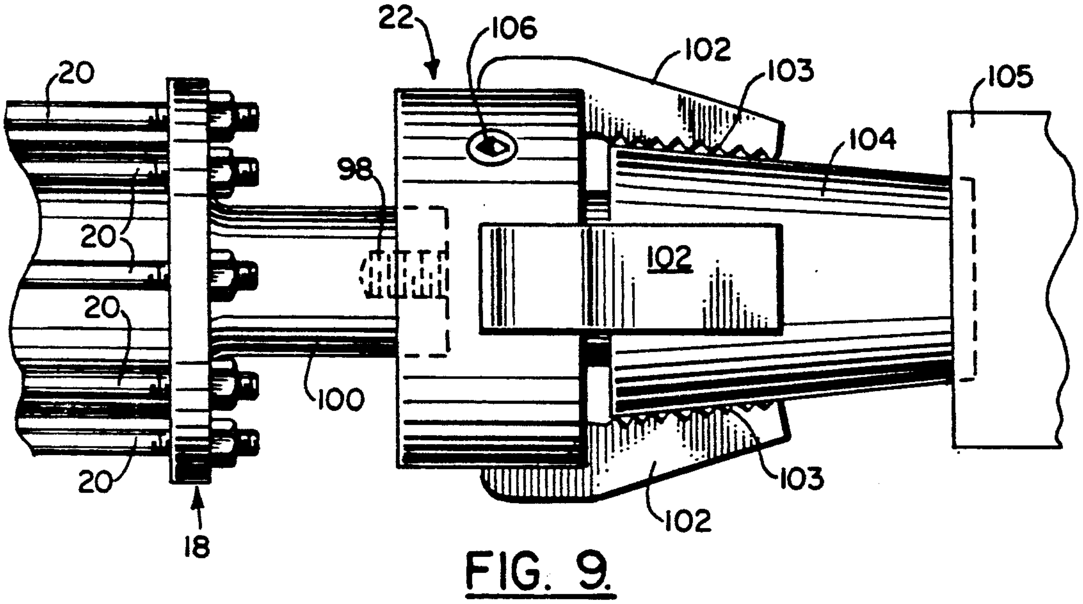
FIG. 9 is a top plan view partly cut-away of the inner end of the pneumatic slide hammer of the invention with a plug removing tool connected thereto.
Figure 10:
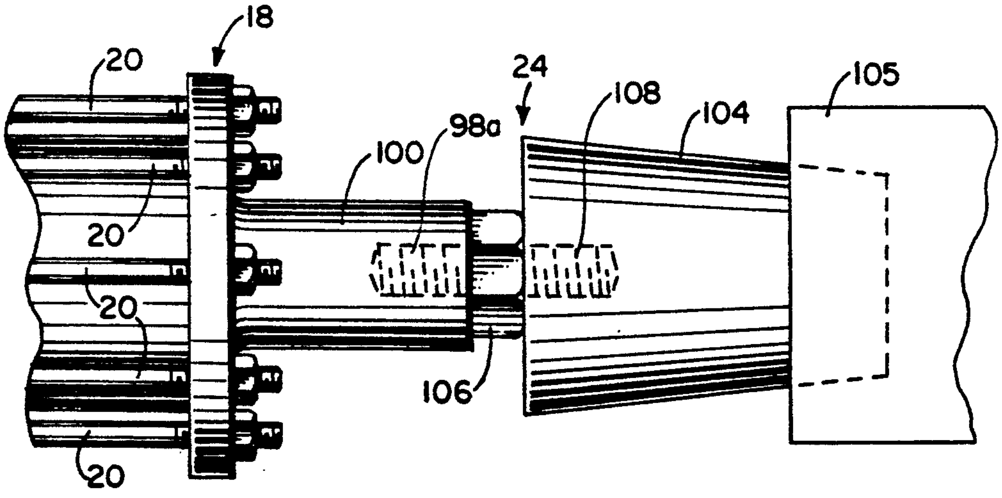
FIG. 10 is a top plan view partly cut-away of the inner end of the pneumatic slide hammer of the invention with an alternate plug removing tool connected thereto.

Flange 18 has a plug removing tool generally indicated by the numeral 22 in FIG. 9 and the numeral 24 in FIG. 10 connected thereto by bolt 98 or the like connected to post 100 of flange 18.

Plug removing tool 22 has a plurality of jaws 102 having teeth 103 thereon which can be fastened around a plug 104 stuck or force fitted in a tube 105 or other structure. The jaws may be held in place by a set screw 106 as is known in the art. If desired, plug removing tool 22 may be a common drill bit chuck which is known in the art for connecting drill bits to rotary drills.

Plug removing tool 24 includes a bolt 98*a* which is threaded into post 100 of flange 18. A nut 106 is preferably connected to bolt 98*a* and a second bolt 108 is threaded into nut 106. Bolt 108 is then threaded into a hole drilled in plug 104 and the pneumatic slide hammer 10 is supplied with air to hammer the plug out of the tube or other structure 105.

Figure 5:
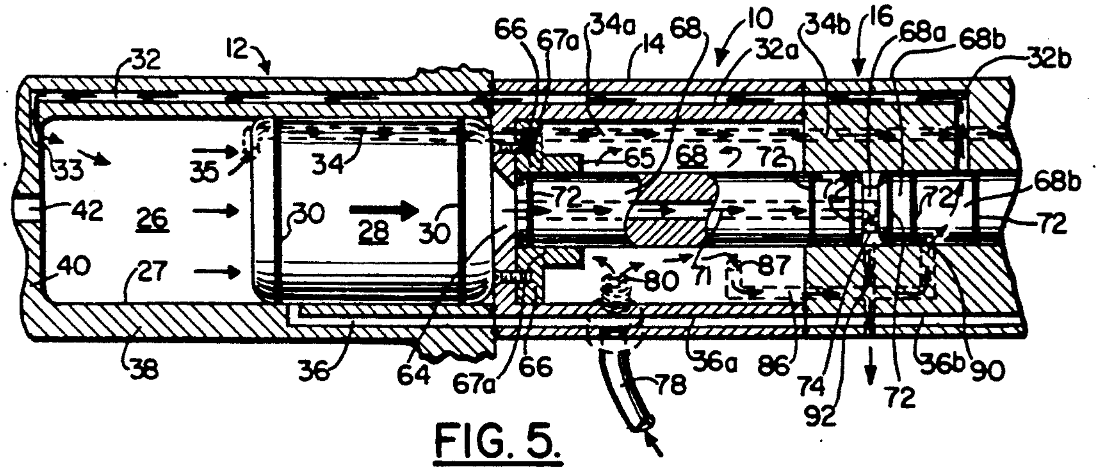
FIG. 5 is a partly cut-away, partly cross-sectional detailed view of a portion of the pneumatic slide hammer of present invention with the air channels shown oriented slightly out of correct orientation for ease of illustration.

The pneumatic slide hammer 10 of the invention operates as follows when supplied with air under pressure through air supply line 78:

Referring primarily to FIG. 5 and the arrows therein indicating the direction of air flow, air under superatmospheric pressure enters line 78 as shown by the arrow in FIG. 5 and exits from port 80 as shown by the arrows to pressurize chamber 58 in first intermediate housing 14. Pressurized air flows through port 87 as indicated by the arrow and flows through air channel 86, through air channel 88, out of port 90, around cylindrical valve 68*b* as shown by the arrows, into air channel 32*b*, into air channel 32*a*, into air channel 32, and out of port 33. Thus the portion of chamber 26 between port 33 and percussive piston 28 is pressurized to superatmospheric pressure, thereby forcing percussive piston toward and against end wall 62 as shown by the arrow on percussive piston 28.

As percussive piston 28 moves in the direction indicated by the arrow on percussive piston 28 in FIG. 5, air in chamber 26 between the end of percussive piston 28 and end wall 62 vents or flows through passage 64 to air channel 71 in cylindrical valve 68 and to the atmosphere through air channel 92 as shown by the arrows.

Figure 6:
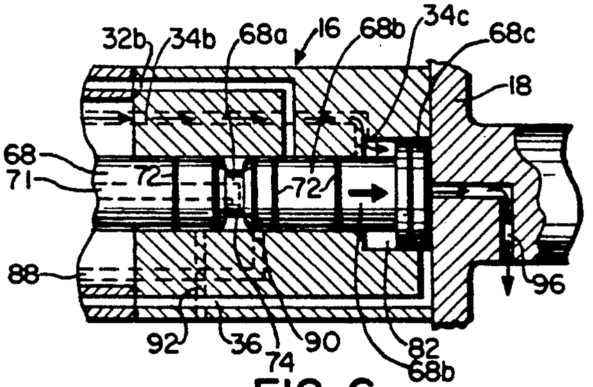
FIG. 6 is a partly cut-away, partly cross-sectional detailed view of a portion of the third intermediate housing of the pneumatic slide hammer of present invention with the air channels shown oriented slightly out of correct orientation for ease of illustration.

As shown in FIGS. 5 and 6, when percussive piston 28 moves against end wall 62, port 35 is exposed and pressurized air from chamber 26 flows into port 35 as shown by the arrow and into air channels 34, 34*a*, and 34*b* and out of port 34*c* to force cylindrical valve portion 68*c* toward and against the face 94 of flange 18. Air in chamber 82 is exhausted to the atmosphere through air channel 96 in flange 18 as shown in FIG. 6.

When cylindrical valve portion 68*c* is forced against flange 18 as shown in FIG. 6, cylindrical valve 68 moves to the position shown in FIG. 7 to open slots 67 and close port 90 as shown in FIG. 6. Thus, air in chamber 58 flows through passage 64 as shown by the arrow in FIG. 7 into chamber 26 to force percussive piston 28 forcefully against base 40 of hammer housing 12 as indicated by the arrow on percussive piston 28 in FIG. 7 as air exhausts through air channel 42, around ball 44, into chamber 52 and out of air channels 54 to the atmosphere. Percussive piston 28 impacting against base 40 forces plug 104 out of tube or structure 105.

As shown in FIG. 7, when percussive piston moves in the direction indicated by the arrow toward base 40, port 37 is exposed. Air under superatmospheric pressure then enters air channel 36 and exits through port 36*c* shown in FIG. 8 to force cylindrical valve 68c in the direction indicated by the arrow in FIG. 8 on cylindrical valve 68c.

The pneumatic slide hammer 10 of the invention repeats the cycle described above preferably as long as air under superatmospheric pressure is supplied through air supply line 78. Preferably, pneumatic slide hammer 10 cycles two or three times per second when air is supplied to supply line 78 at a pressure of 90 pounds per square inch. The cycle time of pneumatic slide hammer 10 can be changed by changing the diameter of air channels 32, 32a, and 32b; for example, if the diameter of 32, 32a, and 32b is increased, pneumatic slide hammer 10 will cycle faster and percussive piston 28 will impact upon base 40 more often per unit of time.

Preferably the total weight of pneumatic slide hammer 10 is about 30 pounds for removing plugs about two inches in diameter from heat exchanger tubes. The force with which percussive piston 28 impacts against base 40 is directly proportional to the pressure of the air supplied to air supply line 78.

Although the preferred embodiments of the invention have been described in detail above, it should be understood that the invention is in no sense limited thereby, and its scope is to be determined by that of the following claims:

What is claimed is:

1. A pneumatic slide hammer for removing a plug from a tube comprising:

a. a housing means for connection to said plug, b. a sliding hammer means slidably contained in said housing means for impacting against said housing means to remove said plug from said structure, c. an air supply means connected to said housing means for providing air under superatmospheric pressure to said housing means to slide said sliding hammer means to impact against said housing means, d. a generally cylindrical slidable valve means contained in said housing means for controlling the flow of air under superatmospheric pressure to slide said sliding hammer means in said housing means, said housing means including:

i. a hammer housing means for slidably receiving said sliding hammer means, said hammer housing means having a two ended first cylindrical air chamber means having a base means at one end for receiving the impact from said sliding hammer means and a wall means located at the other end of said first cylindrical air chamber against which said sliding hammer means slides after impacting said base means, said wall means having air passage means therein, said base means having check valve means to exhaust air from said hammer housing means to the atmosphere as said sliding hammer is sliding toward impact with said base means, ii. a first intermediate housing means connected to said hammer housing means in axial alignment therewith for slidably receiving said slidable valve means, said air supply means being connected to said first intermediate housing means to supply air under superatmospheric pressure to said first intermediate housing means, said first intermediate housing means containing second cylindrical air chamber means for receiving superatmospheric air from said air supply means and supplying air under superatmospheric pressure to said first cylindrical chamber means through a slotted flanged cylinder means and said air passage means, when said slidable valve means slides to a selected position, to slide said sliding hammer means within said first cylindrical chamber means to impact against said base means, iii. a second intermediate housing means connected to said first intermediate housing means in axial alignment therewith for slidably receiving said slidable valve means, said second intermediate housing means having first air channel means for connecting said second cylindrical air chamber means to a third generally cylindrical chamber means in said second intermediate housing means and conveying superatmospheric air from said second cylindrical air chamber means to said third generally cylindrical chamber means, said second cylindrical air chamber means having located therein said slotted flanged cylinder means connected to said wall means for receipt of said sliding valve means, said second intermediate housing means having second air channel means connecting said first generally cylindrical air chamber means to said third generally cylindrical chamber means for conveying superatmospheric air from said third generally cylindrical chamber means to said first cylindrical air chamber means between said base means and said sliding hammer means to slide said sliding hammer means from said base means to said wall means, said second intermediate housing means having third air channel means connecting said first generally cylindrical air chamber means to a fourth cylindrical air chamber means locate in said second intermediate housing means for receiving superatmospheric air from said first cylindrical air chamber means to slide said sliding valve means away from said wall means to permit air in said first air chamber means to flow through said wall means into said first generally cylindrical air chamber means to slide said sliding hammer means toward said base means into impact with said base means, said second intermediate housing means having fourth air channel means connecting said first cylindrical air chamber means to said fourth cylindrical air chamber means to slide said slidable valve means toward said wall means to block the flow of superatmospheric air from said second cylindrical air chamber means through said wall means into said first air chamber means, and iv. a flange means connected to said second intermediate housing means for connection to said plug to be removed from said tube.

2. The pneumatic slide hammer of claim 1 wherein said slidable valve means has fifth air channel means therein for conveying air used to slide said hammer means to impact against said housing means to the atmosphere after said sliding hammer means has impact upon said base means.

3. The pneumatic slide hammer of claim 2 wherein said slidable valve means has a reduced diameter portion selectively communicating with said fifth air channel means in said slidable air valve means for alignment with first exhaust air channel means located in said housing means for selectively conveying air between said sliding hammer means and wall means after said sliding hammer means has impacted upon said base means to the atmosphere.

4. The pneumatic slide hammer of claim 3 wherein said slidable valve means has air seal means for preventing air from flowing between said slidable valve means and said housing means.

5. The pneumatic slide hammer of claim 4, wherein said fourth cylindrical air chamber means has second exhaust air channel means for exhausting air to the atmosphere.

6. The pneumatic slide hammer of claim 5 wherein said slotted flanged cylinder means has a plurality of lands separated by slots through which air can flow from second cylindrical air chamber means to first air chamber means.

* * * * *